United States Patent
Krishnamurthy et al.

(10) Patent No.: US 11,104,512 B2
(45) Date of Patent: Aug. 31, 2021

(54) AUTOMATIC SORTING OF WASTE

(71) Applicant: CleanRobotics, Inc., Pittsburgh, PA (US)

(72) Inventors: Vaishnavi Krishnamurthy, Pittsburgh, PA (US); Puru Rastogi, Pittsburgh, PA (US); Graeme Austin Rock, Pittsburgh, PA (US); Koushil Sreenath, Pittsburgh, PA (US); Charles Arthur Yhap, Longmont, CO (US); Tanner Cook, Aspen, CO (US); Jayant Sharma, Pittsburgh, PA (US)

(73) Assignee: CLEANROBOTICS TECHNOLOGIES, INC., Pittsburgh, PA (US)

( * ) Notice: Subject to any disclaimer, the term of this patent is extended or adjusted under 35 U.S.C. 154(b) by 1083 days.

(21) Appl. No.: 15/649,988

(22) Filed: Jul. 14, 2017

(65) Prior Publication Data

US 2018/0016096 A1 Jan. 18, 2018

Related U.S. Application Data

(60) Provisional application No. 62/363,028, filed on Jul. 15, 2016.

(51) Int. Cl.
*B65F 1/00* (2006.01)
*B65F 1/14* (2006.01)

(52) U.S. Cl.
CPC .............. *B65F 1/14* (2013.01); *B65F 1/1426* (2013.01); *B65F 1/004* (2013.01);
(Continued)

(58) Field of Classification Search
CPC ........... B65F 1/004; B65F 1/1426; B65F 1/14
(Continued)

(56) References Cited

U.S. PATENT DOCUMENTS 5,209,355 A * 5/1993 Mindermann .......... B07C 5/344
209/3.1
5,257,577 A 11/1993 Clark
(Continued)

FOREIGN PATENT DOCUMENTS

EP 0754096 A1 1/1997
EP 0799152 B1 10/1998
(Continued)

OTHER PUBLICATIONS

Machine translations of Roland EP0754096, Jan. 1997.*
(Continued)

*Primary Examiner* — Charles A Fox
*Assistant Examiner* — Michael E Butler
(74) *Attorney, Agent, or Firm* — Fox Rothschild LLP

(57) ABSTRACT

A waste sorting system uses various sensors to automatically determine a type of a piece of waste, and dispense the waste into an appropriate waste bin, such as a recyclable waste bin, or a landfill waste bin. If the system determines that the piece of waste is of a type that is recyclable, it will first determine whether the waste satisfies a recyclability threshold before it deposits the waste into a recyclable waste bin. If the waste does not satisfy the recyclability threshold, the system will direct the piece of waste to a non-recyclable waste bin even if it is of a type that would otherwise be recyclable if it had met the recyclability threshold.

25 Claims, 11 Drawing Sheets

(52) U.S. Cl.
CPC . *B65F 2001/008* (2013.01); *B65F 2001/1489* (2013.01); *B65F 2210/128* (2013.01); *B65F 2210/132* (2013.01); *B65F 2210/148* (2013.01); *B65F 2210/152* (2013.01); *B65F 2210/1522* (2013.01); *B65F 2210/1525* (2013.01); *B65F 2210/1527* (2013.01); *B65F 2210/16* (2013.01); *B65F 2210/168* (2013.01); *B65F 2210/176* (2013.01); *B65F 2210/184* (2013.01); *B65F 2210/20* (2013.01); *Y02W 30/10* (2015.05)

(58) Field of Classification Search
USPC .................................................. 209/606
See application file for complete search history.

(56) References Cited

U.S. PATENT DOCUMENTS

| | | | |
|---|---|---|---|
| 5,447,017 | A | 9/1995 | Becher et al. |
| 5,568,871 | A | 10/1996 | Shantzis |
| 5,979,240 | A * | 11/1999 | Rix ..................... G01N 29/12 209/930 |
| 6,329,139 | B1 * | 12/2001 | Nova ................... B01J 19/0046 209/597 |
| 7,481,159 | B2 | 1/2009 | Poss et al. |
| 8,287,433 | B2 * | 10/2012 | Kishii ................... E02F 9/2079 477/181 |
| 9,050,719 | B2 | 6/2015 | Valpola et al. |
| 9,234,838 | B2 | 1/2016 | Sommer, Jr. |
| 9,239,286 | B2 | 1/2016 | Saeedkia |
| 9,272,842 | B1 | 3/2016 | Torres-Muniz et al. |
| 9,352,887 | B2 | 5/2016 | Poss et al. |
| 9,573,167 | B2 | 2/2017 | Marrapodi et al. |
| 2006/0070928 | A1 * | 4/2006 | Lovhaugen ........... B07C 5/3422 209/576 |
| 2010/0168907 | A1 | 7/2010 | Valerio |
| 2012/0094324 | A1 * | 4/2012 | Durack ................. C12M 23/16 435/34 |
| 2013/0112791 | A1 | 5/2013 | Jeon |
| 2013/0296628 | A1 * | 11/2013 | Cho ....................... C03B 5/021 588/15 |
| 2014/0305851 | A1 | 10/2014 | Hubbell et al. |
| 2014/0311956 | A1 | 10/2014 | Gomez et al. |
| 2014/0379588 | A1 | 12/2014 | Gates et al. |
| 2015/0060419 | A1 * | 3/2015 | Green .................. B23K 26/032 219/121.62 |
| 2015/0307273 | A1 | 10/2015 | Lyman |

FOREIGN PATENT DOCUMENTS

| | | |
|---|---|---|
| EP | 0899215 A1 | 3/1999 |
| EP | 1415937 A1 | 5/2004 |
| EP | 1508535 A1 | 2/2005 |
| EP | 2873632 A1 | 5/2015 |
| WO | 2006130911 A1 | 12/2006 |
| WO | 2016113662 A1 | 7/2016 |

OTHER PUBLICATIONS

A. Babu S, et al., "An Economic Automatic Waste Segregator using Arduino", International Journal of Research in Advent Technology, vol. 4, No. 7, Jul. 2016, pp. 112-116.

Chandramohan, A. et al., "Automated Waste Segregator", 2014, Rashtreeya Vidyalaya College of Engineering.

Russel, Mahmudul H. et al., "Development of Automatic Smart Waste Sorter Machine", International Conference on Mechanical, Industrial and Materials Engineering 2013 (ICMIME2013) Nov. 1-3, 2013, RUET, Rajshahi, Bangladesh.

Automated waste sorting machine RFID, published on May 24, 2016, screen shot from Youtube, <https://www.youtube.com/watch?v=_NMhaHlva90>.

Automated Waste Sorting Receptacle (Full Demo), published on May 14, 2015, screen shot from Youtube, <https://www.youtube.com/watch?v=v95lfjz9sSg>.

Smart recycle bin wins record-breaking MHacks hackathon, Sep. 24, 2013, printed from the internet, <https://phys.org/news/2013-09-smart-recycle-bin-record-breaking-mhacks.html>.

Supplementary European Search Report, European Patent Application No. EP17828518, dated Mar. 24, 2020.

* cited by examiner

AUTOMATIC SORTING OF WASTE

CROSS REFERENCE TO RELATED APPLICATION

This patent document claims priority to U.S. Provisional Patent Application No. 62/363,028, titled "Automatic Sorting of Waste", filed Jul. 15, 2016, which is incorporated herein by reference in its entirety.

BACKGROUND

This patent document is related to an automatic sorting of waste and, more specifically, to methods and systems that automatically determine recyclable and non-recyclable pieces of waste and sorts them accordingly to the determined type.

Single-stream recycling plants are only 10% efficient at reclaiming usable material, meaning 90% of waste that enters such recycling plants goes to landfills. The majority of this low efficiency is caused by users failing to throw away their waste in the correct bins, as well as users inserting overly-contaminated recyclables into recyclable bins. Users often face numerous unclear recycling regulations without consequential feedback for their decisions, leading to confusion and/or apathy toward recycling.

Additionally, even in instances where a user disposes of recyclable waste in the appropriate bin or container, the waste may be too contaminated to be processed as anything other than landfill waste. For example, an empty plastic beverage bottle may generally be considered to be recyclable, but a plastic beverage bottle filled with a certain amount of liquid may not be acceptable as a recyclable item at the downstream recycling plant. Similarly, corrugated cardboard may generally be considered to be recyclable, but cardboard materials contaminated with food, grease, etc. may no longer be acceptable as a recyclable item. Regardless, many users still place these contaminated items in a corresponding recycling bin, resulting in the need to sort and dispose of the contaminated item at the downstream recycling plant, which adds significant time and expense to the recycling process. Furthermore, contaminated recyclable products that are placed in recycling bins may lead to the contamination of commingled, otherwise-recyclable items, further reducing the efficiency of reclaiming reusable materials.

SUMMARY

The technology presented here includes systems and methods to automatically determine the type of waste deposited into a waste container and dispense the waste into an appropriate waste bin, such as a recyclable waste bin, a landfill waste bin, etc., without the need for the user to decipher complicated pictures, or read lengthy instructions, before throwing a piece of waste away.

In an embodiment, a waste sorting system implements a method of identifying and sorting waste. The system may include a waste sorting compartment, various waste bins that include at least a recyclable waste bin and a non-recyclable waste bin, at least two different types of sensors, a processor, and a computer-readable medium containing programming instructions. The processor will execute the instructions and use data detected by the sensors to determine various properties associated with the piece of waste. Based on at least one of the properties from at least a first one of the sensors, the processor will determine whether the piece of waste is formed of a recyclable material. If the piece of waste is not formed of a recyclable material, the processor will cause the waste sorting compartment to deposit the piece of waste into a non-recyclable waste bin. If the piece of waste is formed of a recyclable material, based on at least a second one of the properties from at least a second one of the sensors, the processor will determine whether the piece of waste meets or exceeds a recyclability threshold. If the piece of waste meets or exceeds the recyclability threshold, the processor will cause the waste sorting compartment to deposit the piece of waste into a recyclable waste bin, otherwise it will cause the waste sorting compartment to deposit the piece of waste into a non-recyclable waste bin.

In various embodiments, the sensor types may include, without limitation, two or more of the following: inductance sensors, capacitance sensors, load sensors, cameras, temperature sensors, infrared light sensors, near-infrared light sensors, spectral measurement devices, audio sensors, capacitive sensors, fluorescence sensors, millimeter-wave radar sensors, and depth cameras.

To determine that it should to deposit the piece of waste in the recyclable waste bin, the system may identify the recyclable material. Based on the recyclable material, the system may select the recyclable waste bin from a set of candidate bins that include a recyclable plastics bin, a recyclable paper bin, a recyclable metal bin, a recyclable cloth bin, a recyclable cardboard bin, and/or a recyclable glass bin.

Optionally, the sensors may include a camera, and the data detected by the camera will include a digital image of the piece of waste. If so, then when determining whether the piece of waste is formed of a recyclable material the system may process the digital image to determine whether content of the digital image corresponds to one or more characteristics of a known recyclable object of a data set of known recyclable objects. If the content of the digital image corresponds to one or more characteristics of a known recyclable object, the system will classify the piece of waste as being formed of a recyclable material. If the content of the digital image does not correspond to one or more characteristics of a known recyclable object, the system will classify the piece of waste as being formed of a non-recyclable material. To process the digital image to determine whether content of the digital image corresponds to one or more characteristics of a known recyclable object, the system may determine whether the content of the digital image includes one or more of the following: a logo of a known recyclable object; text of a product name of a known recyclable object; a shape of a known recyclable object; or a color scheme of a known recyclable object.

If one of the sensors is an inductance sensor, then to determine whether the piece of waste is formed of a recyclable material the system may determine whether the inductance sensor indicates that the piece of waste is metallic.

In any of the embodiments above, when the system determines that the piece of waste is a container (such as a plastic bottle, or a food or beverage can), it may determine if the piece of waste meets or exceeds a recyclability threshold by using data received from at least one load sensor to determine whether the container meets or exceeds a weight threshold.

In any of the embodiments above, to determine whether the piece of waste is formed of a recyclable material the system may require that that the piece of waste be classified as non-recyclable if the processor cannot identify with at least 80% certainty that the piece of waste as being formed of a recyclable material.

In some embodiments, upon determining that the piece of waste is not formed of a recyclable material, the system may determine whether the piece of waste is a compostable material. If the piece of waste is a compostable material, the system may deposit the piece of waste in a non-recyclable waste bin that is a compost waste bin. If the piece of waste is not a compostable material, the system may deposit the piece of waste in a non-recyclable waste bin that is a landfill waste bin.

BRIEF DESCRIPTION OF THE DRAWINGS

While the accompanying drawings include illustrations of various embodiments, the drawings are not intended to limit the claimed subject matter.

DETAILED DESCRIPTION

Figure 1A:
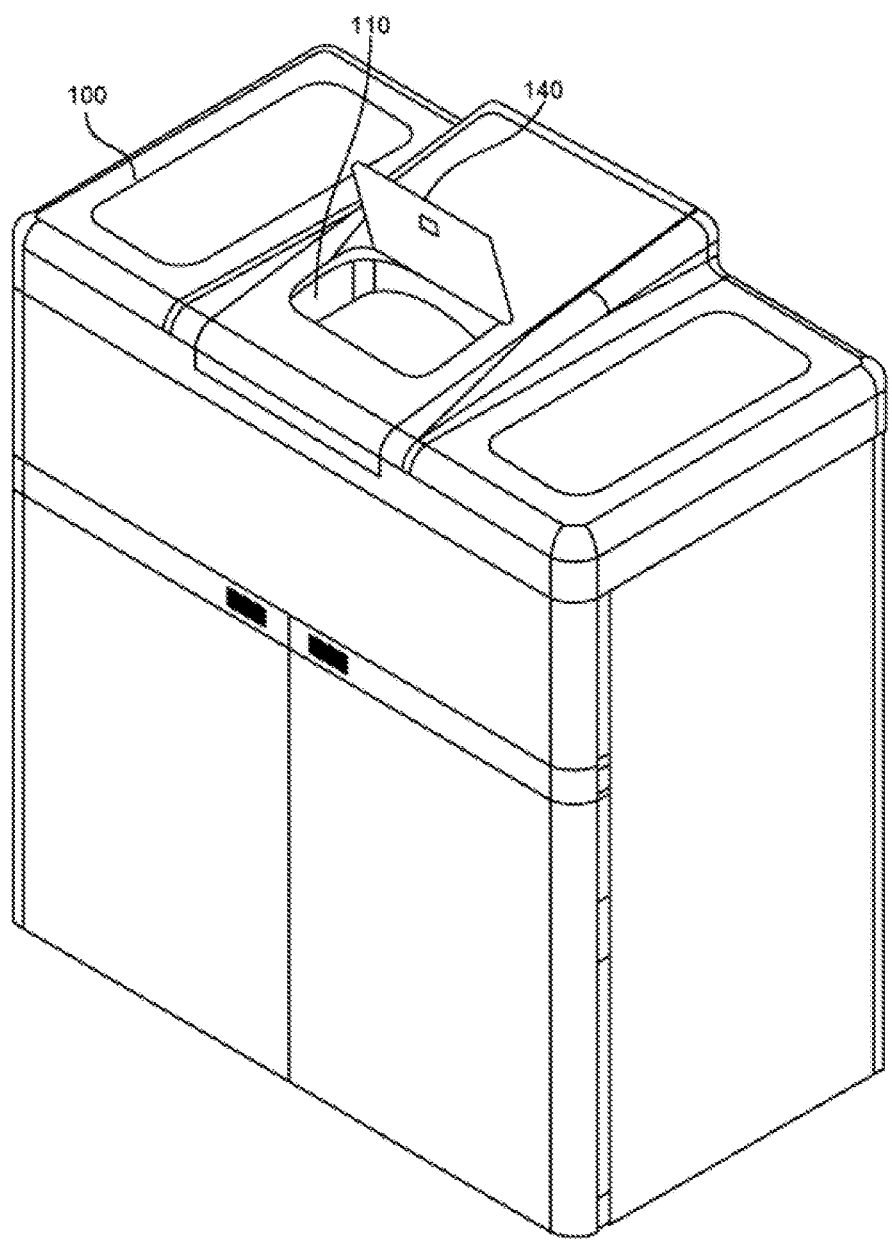
FIGS. 1A-1B show an actuated waste container, according to various embodiments.

Brief definitions of terms, abbreviations, and phrases used throughout this document are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed therebetween, while not sharing any physical connection with one another. Additionally, the words "herein," "above," "below," and words of similar import, when used in this document, shall refer to this document as a whole and not to any particular portions of this application. Where the context permits, words in this specification using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terminology used in this specification is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

The technology presented here includes systems and methods to automatically determine the type of waste deposited into a waste container and dispense the waste into an appropriate waste bin, such as a recyclable waste bin, a non-recyclable (i.e., landfill or compost) waste bin, and/or further categories and subcategories of waste (such as recyclable paper or recyclable plastics) without the need for the user to decipher complicated pictures, or read lengthy instructions, before throwing a piece of waste away.

Figure 1B:
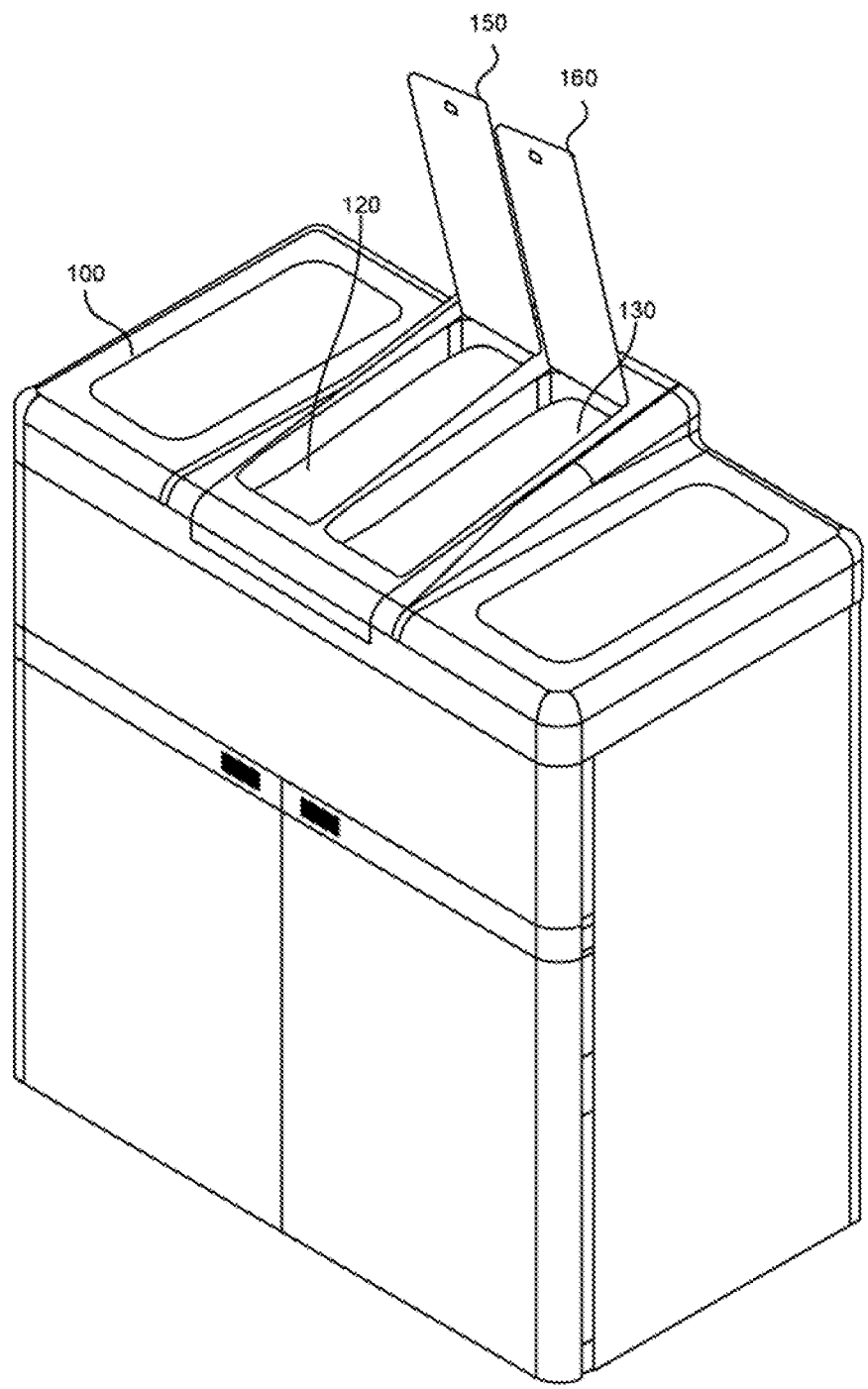

FIGS. 1A and 1B show an example of an actuated waste container, according to various embodiments. The waste container 100 receives a piece of waste through one or more openings 110, 120, 130. The openings 120, 130 can be disposed in various arrangements, such as one opening next to the other as shown in FIG. 1B, one opening behind the other, one opening diagonal with respect to the other, etc. Each opening 110, 120, 130 can be without a cover, can include a flap 140, 150, 160 as shown in FIGS. 1A-1B, can include a sliding door, etc. The sliding door can be configured to toggle between closing opening 120 and closing opening 130. Further, the sliding door can partially close the plurality of openings 120, 130. While three openings 110, 120, 130 are shown in FIGS. 1A-1B, it is to be understood that waste container 100 may include more or fewer openings and/or flaps. In addition, other configurations are possible, such as a room or other locations with separate waste bins arranged near each other proximate one or more waste receiving openings, such as a garbage chute in a building, in which case it may be considered a waste receiving system rather than a single waste container.

The waste container 100 or can include a processor and transceiver that can enable the waste container to send and receive data from one or more remote data storage facilities via a communication network. Alternatively, or in addition, the waste container may itself include a data storage facility. In addition, the waste container may include a transceiver that sends data to, and receives commands from, a remote processor via a communication network. The remote processor can be associated with a remote computer system such as a server, a desktop computer, a laptop computer, a mobile device, a personal digital assistant, etc.

By way of example, the communication network may include a data network, a wireless network, a telephony network, or any combination thereof. The data network may be any local area network (LAN), metropolitan area network (MAN), wide area network (WAN), a public data network (e.g., the Internet), short range wireless network (such as a Wi-Fi network), a packet-switched network (e.g., a proprietary cable or fiber-optic network and the like), or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad hoc network (MANET), and the like), or any combination thereof.

Figure 2:
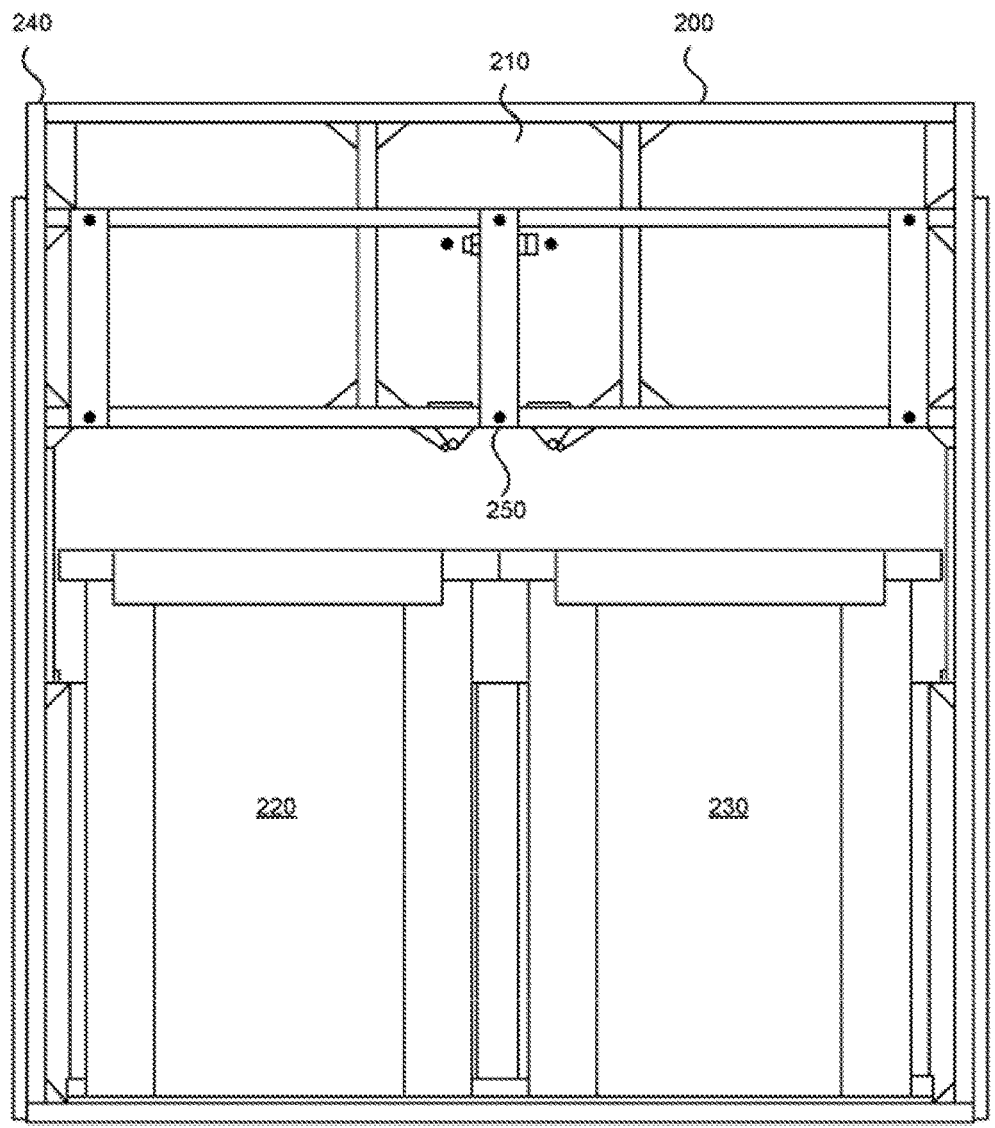
FIG. 2 shows the cross section of the waste container, according to one embodiment.

FIG. 2 shows the cross section of various components of a waste sorting system, according to one embodiment, in this case an embodiment that includes a waste sorting container. Waste container 200 includes the one or more actuated sorting compartments 210 which are disposed above two or more waste bins 220, 230. The waste bins 220, 230 can be designated for recyclables, landfill garbage, metal, compost, hazardous waste, etc. A piece of waste exits the one or more sorting compartments 210 out the bottom 250 into one of the two or more waste bins 220, 230. The frame 240 associated with the waste container 200 can be any kind of structural material, including plastic rods, aluminum bars, or other metals. The size of the waste container and/or the number and/or size of waste bins may be customizable based on local waste disposal regulations. For example, a municipality allowing mixed recycling (i.e., the mixing of most or all recyclable materials in one container or bin) may only necessitate two waste bins, i.e., one for recyclables and one for landfill waste. On the other hand, a municipality requiring sorted recycling (i.e., individual containers or bins for most or all recyclables) may necessitate more than two waste bins.

The one or more sorting compartments 210 include various sensors that collect data that the processor can use to identify the piece of waste when it is received into any of the sorting compartments 210. Sensors can be disposed within, underneath, and/or above the one or more actuated sorting compartments 210 to sense the contents within the one or more actuated sorting compartments 210. The sensors can include, for example, inductive sensors, capacitive sensors, photoelectric sensors, load sensors, cameras, temperature sensors, infrared sensors, near-infrared sensors, spectral imaging sensors (such as spectrometers), audio sensors, capacitive sensors, fluorescence sensors, millimeter-wave radar sensors, or depth cameras such as a red/green/blue (RGB) depth cameras, etc. The waste sorting system also may include one or more display devices or audio outputs (speakers), to output information to a user as described below.

Figure 3:
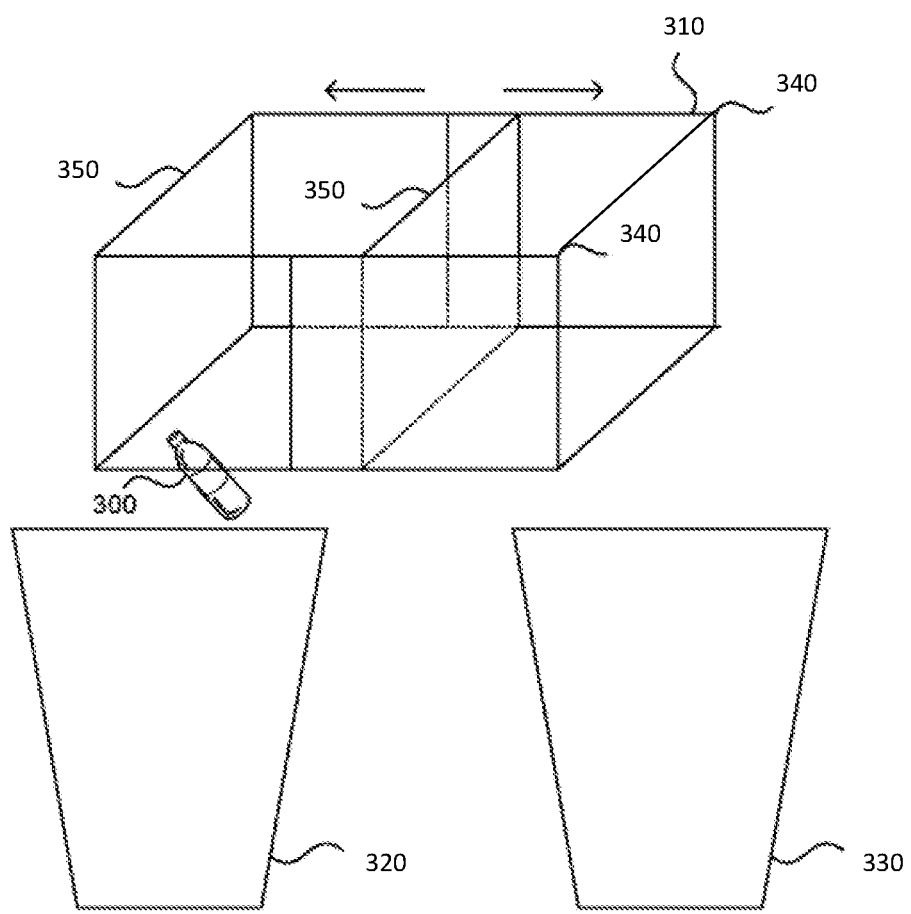
FIG. 3 shows the actuated sorting compartment, according to one embodiment.

FIG. 3 shows an example of a waste sorting system in which a sorting compartment 310 may move waste over two or more waste bins, each if which is designated to receive a particular waste time. Once the processor has identified the waste type of the piece of waste placed inside the one or more sorting compartments 310. The processor will then determine an appropriate waste bin 320, 330 into which to deposit the waste. The compartment includes a first set of walls that are oriented in a first direction and a second set of walls that are oriented in a second direction that is perpendicular to the direction of the first set of walls. One or more of the walls 350 of the sorting compartment 310 may be actuated to move the piece of waste 300 to an appropriate waste bin 320, 330. For example, if the piece of waste 300 is a plastic bottle, as shown in FIG. 3, two of the walls 350 may be actuated to move the piece of waste 300 to the left, to the recyclable waste bin 320. If the piece of waste 300 is not recyclable, two or more of the walls 350 are actuated to move the piece of waste 300 to the right, to the landfill waste bin 330. In addition, walls 340 can be actuated to move the piece of waste 300 front and back, and dispose the piece of waste 300 to additional waste bins placed inside the waste container. At least one, and in some embodiments at least two, of the walls 350 move linearly to the left or to the right. At least one, and in some embodiments at least two, of the walls 340 move linearly front and back. The walls 340, 350 can be moved by a servomotor or a direct drive system.

Figure 4:
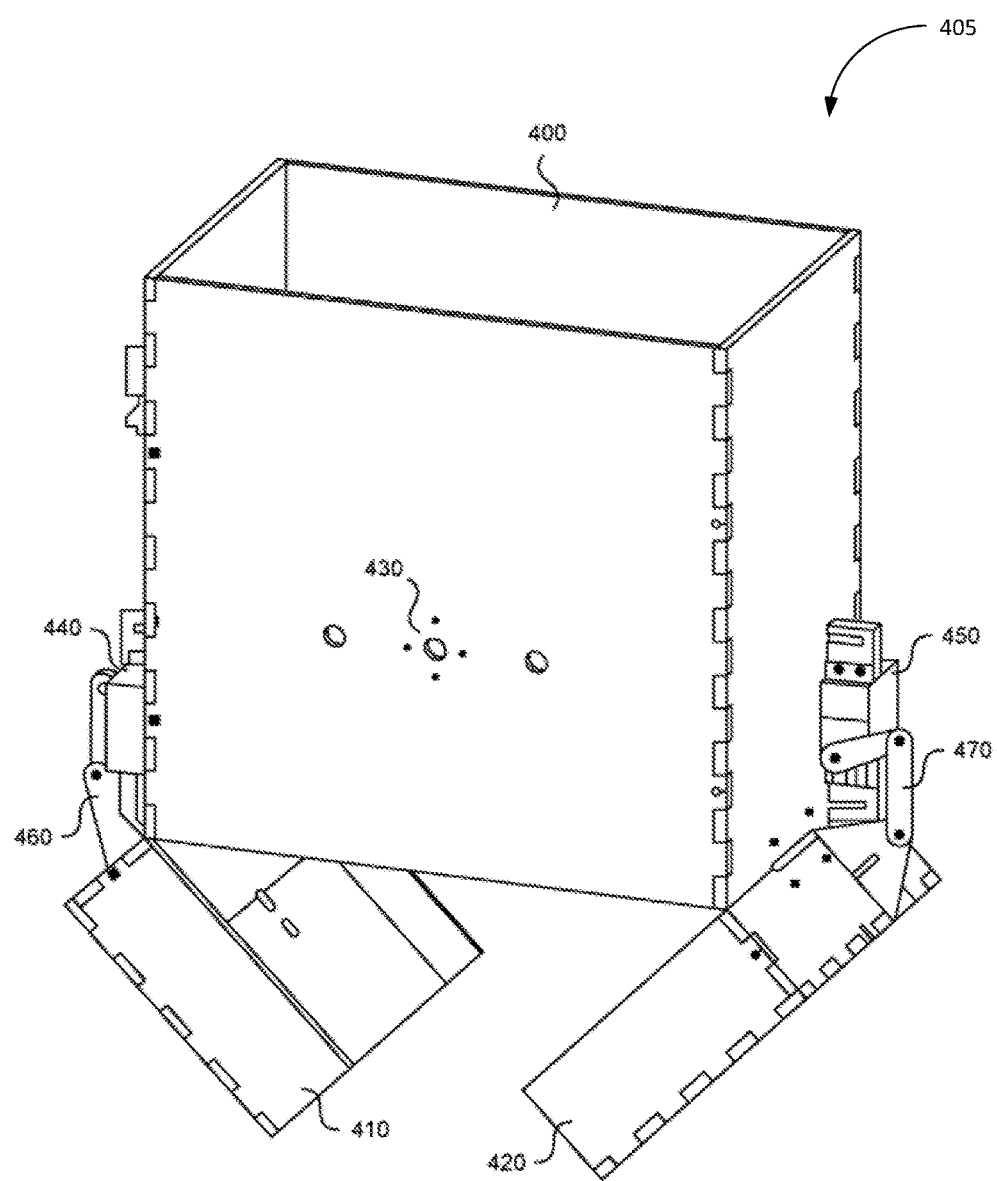
FIG. 4 shows the actuated sorting compartment, according to another embodiment.

Other types of automated sorting compartments are possible. For example, FIG. 4 shows an actuated sorting compartment 405, according to another embodiment. The actuated sorting compartment 405 includes an opening 400 through which waste can enter the compartment, one or more actuated exit doors 410, 420 through which waste can exit the actuated sorting compartment 405, and sensors for sensing the types of waste that enter the compartment.

Sensors can be disposed within, underneath, and/or above the one or more actuated sorting opening 400 to sense the contents within, or as content enters into, the actuated sorting compartments 405. As with the previous example, the sensors can include one or more inductive sensors, capacitive sensors, photoelectric sensors, load sensors, cameras, temperature sensors, infrared sensors, near-infrared sensors, spectral imaging devices, audio sensors, capacitive sensors, fluorescence sensors, millimeter-wave radar sensors, depth cameras such as a RGB depth cameras, etc. The actuated exit doors 410, 420 may contain additional sensors such as load sensors and metal detection sensors that are housed underneath a layer of waste-resistant material, such as a waterproof lining.

A pivot 430 associated with the actuated sorting compartment 405 is driven by a motor, such as a servomotor or a direct drive system. The motor can cause the actuated sorting compartment 405 to rotate about a horizontal axis, rotate about a vertical axis, to move linearly above the appropriate waste bin, etc. The actuated exit doors 410, 420 include motors 440, 450 and beam assemblies 460, 470, respectively, to open and close the actuated exit doors 410, 420.

For example, the processor determines that the piece of waste placed inside the actuated sorting compartment 405 belongs to the landfill waste bin. The landfill waste bin is located to the right of the actuated sorting compartment 405. The actuated sorting compartment 405 rotates counterclockwise around the pivot 430 to position the actuated exit doors 410, 420 above the landfill waste bin. The motors 440, 450 and the beam assemblies 460, 470 open the actuated exit doors 410, 420 to release the piece of waste into the landfill waste bin.

Figure 5A:
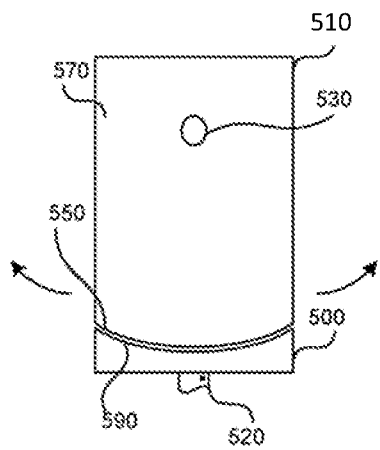
FIGS. 5A-5C show a front and a three-quarters view of the actuated sorting compartment, according to one embodiment.
Figure 5B:
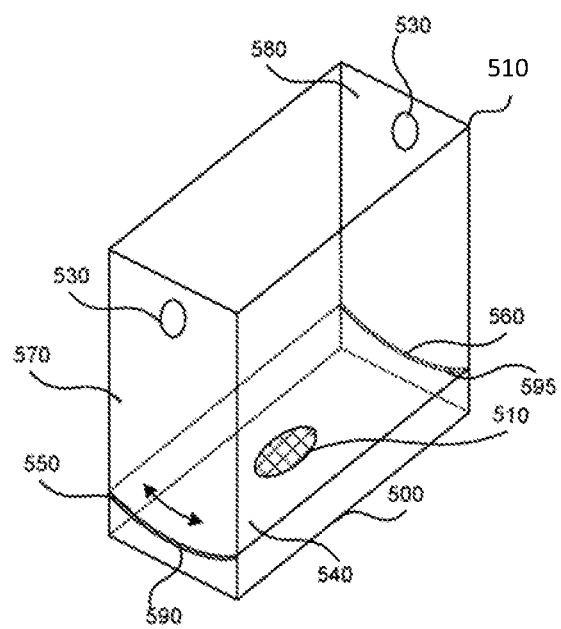
Figure 5C:
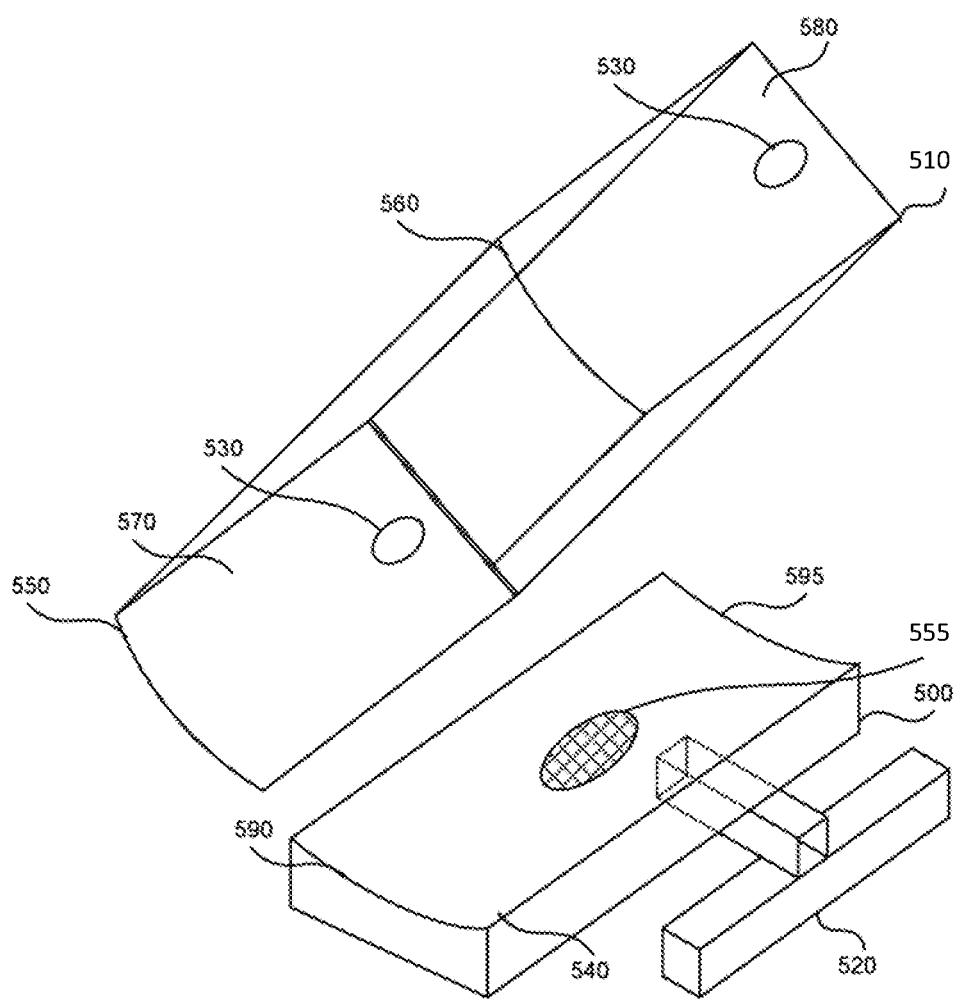

FIGS. 5A-5C show a front and a three-quarters view of another embodiment of an actuated sorting compartment 510, according to one embodiment. The actuated sorting compartment 510 is disposed on top of a liquid collection compartment 500. The liquid collection compartment 500 is stationary, while the actuated sorting compartment 510 rotates around the pivot 530. The actuated sorting compartment 510 does not have a bottom, and the piece of waste deposited inside the actuated sorting compartment 510 rests on the top surface 540 associated with the liquid collection compartment 500. A load sensor 520 can be attached to the liquid collection compartment 500 to measure the weight of the piece of waste. The shape of the top surface 540 is concave, and a drainage hole 555 is placed at the lowest point associated with the top surface 540 so that the liquid from the piece of waste drains into the liquid collection compartment 500. The bottom edges 550, 560 of the walls 570, 580, respectively, follow the curvature of the edges 590, 595 associated with the top surface 540. The actuated sorting compartment 510 can rotate around the pivot 530 without rubbing against the edges 590, 595 associated with the top surface 540.

Figure 6:
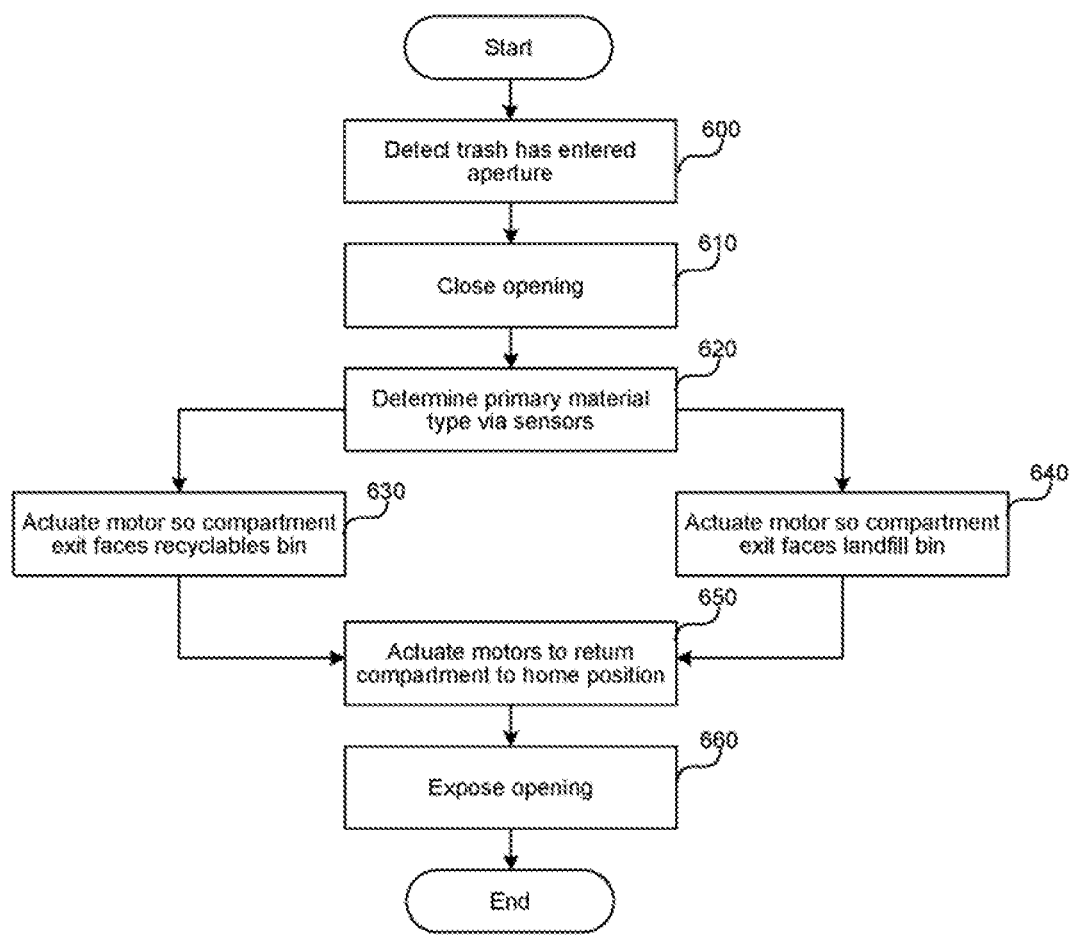
FIG. 6 is a flowchart of a method to process a piece of waste within the waste container, according to one embodiment.

FIG. 6 is a flowchart of a method to process a piece of waste within the waste container, according to one embodiment. In step 600, the processor uses data from one or more sensors to detects when a piece of waste has been received into the waste sorting system. It the waste storing system is a container such as that shown in FIGS. 1A, 1B and 2, In step 610, the processor may cause a movable door to actuate and close or lock the opening to prevent the user from interfering with the processing of the piece of waste. In step 620, the processor determines using one or more sensors to determine a type of the waste and whether the waste is formed of a recyclable material or a non-recyclable material. The waste type may recyclable material or non-recyclable material. Non-recyclable materials may be subcategorized as landfill material, compost material, or other categories. If the material type is determined to be a recyclable material, the material type can further be categorized as plastic, paper, metal, or other recyclable material types. Furthermore, each material type category can have a subcategory. For example, plastic can be classified as P1 plastic, P2 plastic, etc.; paper can be classified as office paper, cardboard, etc. In step 630, when the material is determined to be a recyclable material such as metal, plastic, paper, cardboard, cloth, or glass, the processor causes the an actuated sorting compartment to deposit the waste into an appropriate waste bin, such as by activating the motor so that the actuated sorting compartment releases the piece of waste into the recyclable waste bin. In step 640, when the material is landfill material, the processor activates the motor so that the actuated sorting compartment releases the piece of waste into the landfill waste bin. In step 650, the actuated sorting compartment returns to its rest position. In step 660, the opening is exposed to the user to receive another piece of waste.

Figure 7:
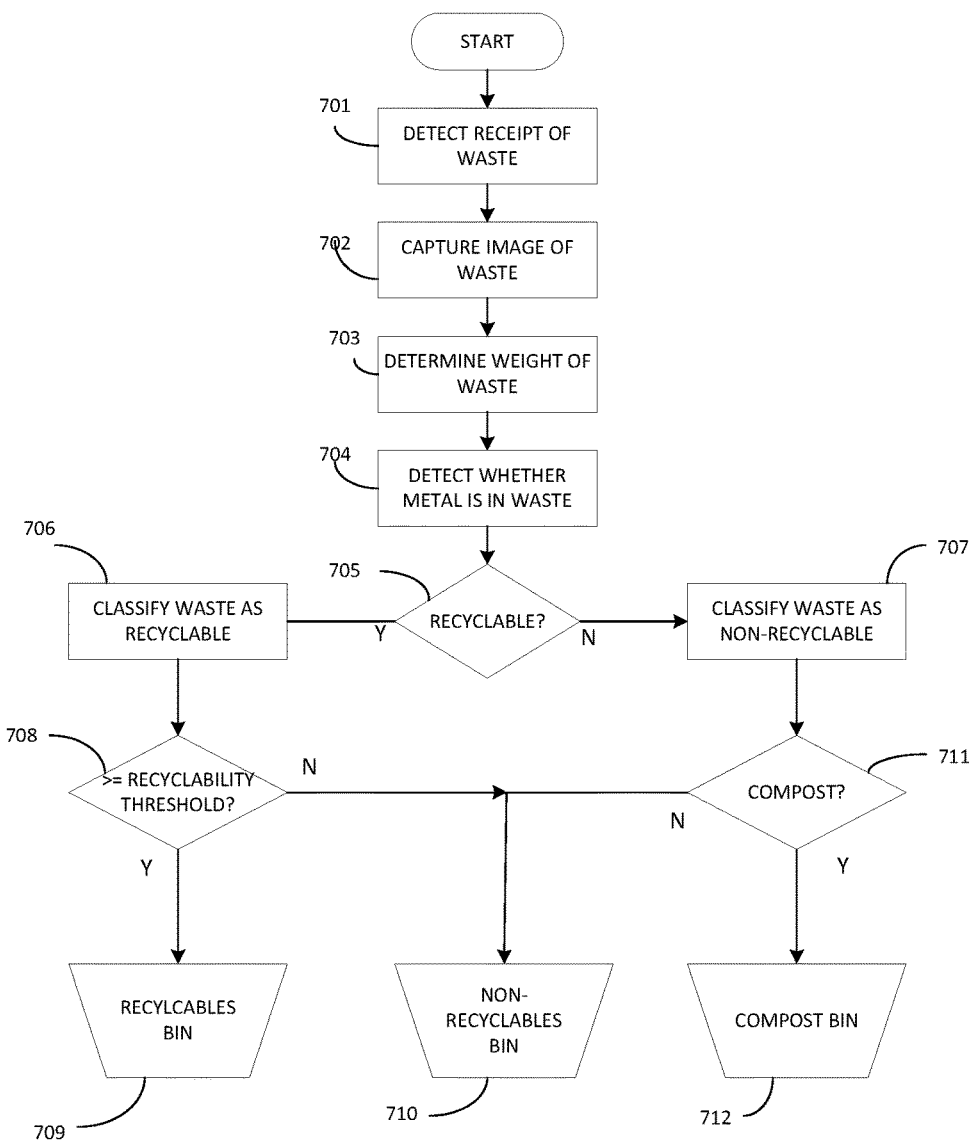
FIG. 7 is a flowchart of a method to determine the type of waste placed within the waste container, according to one embodiment.

FIG. 7 is a flowchart of a method to automatically sort waste, according to one embodiment. Any of the system's sensors may detect that a piece of waste has been received into the system (step 701). For example, a motion detection sensor may detect motion of an item in an opening of the system, a door opening sensor may detect that someone has opened a door of the system to place waste into it, or a load sensor may detect that a weight has been received. Two or more sensors will capture data points that the system will use to determine the type of waste and which waste bin should receive the piece of waste. For example, a camera may capture a digital image of the piece of waste placed within the waste container (step 702). A load sensor may weigh the piece of waste (step 703). A metal detector circuit may include an inductance sensor and a capacitive sensor that detect whether the piece of waste is made of metal, and if so what type of metal (step 704). Alternatively and/or additionally, one or more other sensors, such as temperature sensors, infrared sensors, spectroscopy sensors, audio sensors, capacitive sensors, fluorescence sensors, millimeter-wave radar sensors, depth cameras, etc., may be used in lieu of, or in addition to, the sensors described above.

The system will analyze data received by at least a first one of the sensors and compare that data to a data set of known waste material types to identify whether the waste is made of a recyclable or non-recyclable material (step 705). For example, in step 705 if the first sensor is a camera the camera may capture a digital image of the waste object and process the digital image to determine whether content of the digital image corresponds to one or more characteristics of a known recyclable object. The image processing may be performed using any now or hereafter known image processing techniques, including but not limited to edge detection, object recognition, feature extraction, and other techniques. The characteristics of known recyclable objects may be stored in a data set that is accessible to the processor. Examples of characteristics of known objects that the data set may store include a logo (such as a product trademark), text of a known product name, a shape, and/or a color scheme.

If the content of the digital image corresponds to one or more characteristics of a known recyclable object in the data set, the system will classify the piece of waste as being formed of a recyclable material (step 706) and either deposit it into a recyclable waste bin (step 709) or perform additional analysis as described below.

If the content of the digital image does not correspond to one or more characteristics of a known recyclable object, the system will classify the piece of waste as being formed of a non-recyclable material (step 707) and direct it to a non-recyclable waste bin (step 710). Optionally, the system may analyze the sensed data to determine whether this material is compostable (step 711) and if so direct the material to a compostable waste bin (step 712).

If the content of the digital image corresponds to one or more characteristics of a known recyclable object in the data set, the system will classify the piece of waste as being formed of a recyclable material (step 706) and either deposit it into a recyclable waste bin (step 709) or perform additional analysis as described below.

As another example, if one of the sensors in an inductance sensor (on its own or in combination with other sensors of a metal detector), the system may determine that the waste is formed of a recyclable material if the inductance sensor indicates that the piece of waste is metallic.

Instead of just one sensor, the system may analyzes the image produced by the camera, the weight measurement produced by the load sensor, and the inductance measured by the inductance sensor in combination to determine the type of waste, using any suitable algorithms, or comparison of the sensed data to characteristics of material types as stored in a data set.

In step 705 or 708, if one of the sensors is a camera, to analyze the image produced by the camera, the processor may use vision algorithms to produce a list of categories and a corresponding list of probabilities associated with the object. The processor may utilize a machine learning method such as, for example, Bayesian Classification, which may compare the image or other captured sensor data against a trained data set to determine the probability that the item in the image represents a particular, known item. For example, given an image, the vision algorithm may produce the list of categories: {a bottle, a cup, a stick, a ball} and the corresponding list of probabilities: {0.6, 0.3, 0.1, 0.2}. In this example, the list of probabilities indicates that the image is a bottle with the probability of 0.6, a cup with the probability of 0.3, a stick with the probability of 0.1 and a ball with the probability of 0.2.

Before depositing a recyclable material into a recyclable waste bin, the system may use additional sensed data to determine whether the waste meets a recyclability threshold (step 708). For example, if the classification step determined that the piece of waste is a food or beverage container, the recyclability threshold may be a requirement that the container contain no more than a threshold amount of liquid or other material. The system may then determine the weight of the object and determine whether the weight meets or exceeds a threshold beyond which recyclability is not possible. As another example, if the classification step determined that the piece of waste is a cardboard box, the system may use a sensor (such as a camera) to determine whether the box is a pizza box, and if so move the box to a non-recyclable waste bin based on a rule that pizza boxes are typically contaminated with food particles and thus expected to be non-recyclable.

The system also may take weight of the object into account when determining whether or not a particular piece of waste is recyclable (step 705). For example, the system may store a table of weights and corresponding pieces of waste in a memory. For example, the table may include information that landfill paper typically weighs in the range of 11 g-23 g, a metal can typically weighs in the range of 13 g-15 g, a plastic container typically weighs in the range of 14 g-19 g, etc. The weight categories can correspond to the categories produced by the vision algorithm, can be overlapping, or can be disjointed. Based on the weight of the piece of waste placed in the waste container, the processor may assign a probability to each category.

The processor can assign the probability to a category in various ways. For example, if the weight falls into several categories, the processor can evenly distribute the probability among the several categories. For example, if the weight of the piece of waste is 16 g, the processor may determine that the probability that the piece of waste is a metal can is 0.0, the probability that the piece of waste is a plastic container is 0.5, and probability that the piece of waste is landfill paper is 0.5. In another embodiment, the processor can assign greater probability the closer the measured weight is to the average weight associated with a particular category. For example, the average weight of the landfill paper is, e.g., 17 g, the average weight of the metal can is, e.g., 14 g, and the average weight of the plastic container is, e.g., 16.5 g. In the current example, the weight of the measured piece of waste is determined to be 16 g. Assigning probability based on the proximity to the average weight, the probability that the piece of waste is a metal can is 0, the probability that the piece of waste is a plastic container is (16 g-14 g)/(16.5 g-14 g)*0.5=0.4, and the probability that the piece of waste a landfill paper is (16 g-11 g)/(17 g-11 g)*0.5=0.417. Normalizing the two probabilities so that they add up to 1, the processor may determine that the probability that the piece of waste is a plastic container is 0.49, while the probability that the piece of waste is a landfill paper is 0.51. The processor may select the higher probability as the material to which the item will be classified.

The system also may take inductance of the object into account when determining whether or not a particular piece of waste is recyclable (step 705), or to determine the recyclability threshold (step 708). To do this, the processor may store a table of inductances and corresponding pieces of waste in the memory. The inductance for most materials is the generally equal, approximately 137 H, except for pieces of trash containing metal, when the inductance varies within 140 H-154 H. Thus, in some embodiments the recyclability threshold may be a particular inductance level (such as 140 H). Based on the measurement received, the processor may assign a probability that the piece of waste is metal. Finally, the processor combines the probabilities associated with various categories received from image analysis, weight analysis, and inductance analysis to determine the type of waste deposited in the waste container.

In the event that the processor is unable to positively identify that a piece of waste is a particular type of waste with a predetermined level of certainty, the system may automatically divert the waste to a bin designated for landfill disposal. For example, if, after assigning probabilities that a piece of waste is formed of a particular material based on the various sensor input described above, the processor still does not recognize the type of waste with at least 80% certainty, the system may divert the waste to a landfill bin. However, the actual waste-type recognition threshold needed to divert waste to a particular recycling bin is not limited to 80%, and may be customizable and/or adjustable within the processor based on recycling plant preferences, local regulations, etc.

In addition, the processor can be connected to a database via a wired or a wireless network as described herein. The system may store, in a data set in computer-readable memory, information regarding the type of waste received. Further, the data set can associate the type of waste with an identifier (ID) associated with the waste. The processor can also retrieve the information regarding the type of waste in the ID associated with the waste and output information and/or statistics to a user of the system on a display device or via an audio output, if the waste container is equipped with a display or speaker. Such information can be used in utilizing game mechanics to incentivize consuming items that lead to recyclable waste, educating material type in schools about what is recyclable and not, etc. For example, when two different waste containers are placed on two different floors in an office building, the processor can keep track of which floor discarded more recyclable waste, and award incentives, such as game points, to the floor that discarded more recyclable waste.

Figure 9:
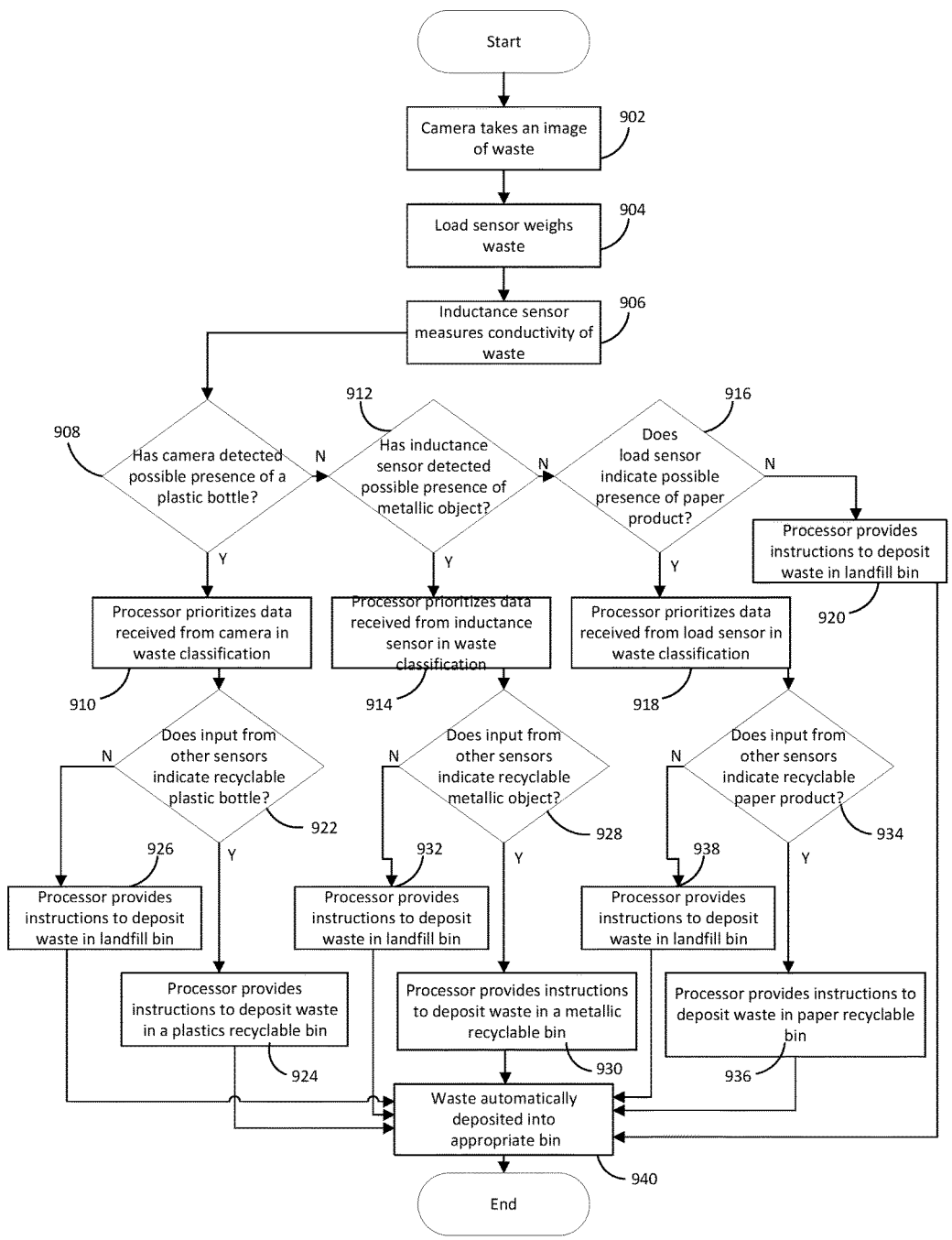
FIG. 9 is a flowchart of a method to determine the type of waste placed within the waste container, according to one embodiment.

FIG. 9 illustrates a variation of FIG. 7 in which the system assesses whether a piece of waste corresponds to a particular item (plastic bottle, metallic object, or paper product. While the method described above with respect to FIG. 7 details the utilization of multiple sensors working in conjunction to classify a piece of waste placed within a waste container and appropriately dispose of that waste, FIG. 9 details a method of determining a type of waste, again utilizing multiple different sensor inputs, but prioritizing classification based on particular sensor inputs.

In step 902, a camera takes an image of the piece of waste placed within the waste container. In step 904, a load sensor weighs the piece of waste, and in step 906, the inductance sensor measures conductivity of the piece of waste. It is to be understood that steps 902, 904, 906 may be performed in any order, and more than one of each applicable sensor may be utilized. Alternatively and/or additionally, one or more other sensors, such as temperature sensors, infrared sensors, spectroscopy sensors, audio sensors, capacitive sensors, fluorescence sensors, millimeter-wave radar sensors, depth cameras, etc., may be utilized in lieu of, or in addition to, one or more of a camera, load sensor, or inductance sensor.

In step 908, it is determined, by a processor executing programming instructions, whether the camera has detected the possible presence of a plastic bottle. As described above, the processor may utilize a machine learning method such as, for example, Bayesian Classification, which may compare the image captured by the camera against a trained data set to determine the probability that the item in the image represents a particular, known item, such as a plastic bottle. If yes, in step 910, the processor prioritizes the data received from the camera in classifying the waste as recyclable or non-recyclable. That is, due to an increased relative confidence that an object captured in an image by the camera is (or is not) a plastic bottle, the processor may be configured to weight the probability determinations related to the camera data more heavily than data received from other sensors (e.g., load sensor(s), inductance sensor(s), etc.). As most plastic bottles are formed of one of a variety of known shapes, sizes, and/or colors, the data received from the camera is more likely the most accurate in determining the type of object.

However, if no, in step 912, the processor then determines whether the inductance sensor has detected the possible presence of a metallic object (e.g., an aluminum beverage can). Again, a machine learning method may be used to compare conductivity data captured by the inductance sensor against a trained data set to determine the probability that an object having a particular conductivity represents a known item, such as, e.g., an aluminum beverage can. If yes, in step 914, the processor prioritizes data received from the induction sensor in classifying the waste as recyclable or non-recyclable. In this case, if the inductance sensor indicates the presence of a metallic object, there is an increased confidence that the detected object may be a recyclable metallic object, such as a beverage can. Thus, the processor may be configured to weigh the probability determinations related to the conductivity data more heavily than data received from other sensors, as a metallic object may be more readily and positively identifiable by an inductance sensor than, for example, a camera or load sensor.

However, if no, in step 916, the processor may determine whether the load sensor indicates the possible presence of a recyclable paper product. As described above, paper products typically fall within a specific weight range (e.g., 11 g-23 g), such that the data received from the load sensor may be used to determine if an object that is not a plastic bottle and is not a metallic object may be a paper product. If yes, in step 916, the processor may prioritize data received from the load sensor in classifying the waste as recyclable or non-recyclable. In this case, if the load sensor indicates the possible presence of a paper product, there is an increased confidence that the detected object may be a recyclable product, such as corrugated cardboard or office paper. Thus, the processor may be configured to weigh the probability determinations related to the weight data more heavily than data received from other sensors, as a paper product may be more readily and positively identifiable by a load sensor than, for example, a camera or inductance sensor.

While steps 902, 904, 906 are described using a camera, inductance sensor, and load sensor respectively and in that order, it is again to be understood that the steps may be performed in any order, and the determination steps 908, 912, 916 may similarly be determined in any order. Also, while a camera, inductance sensor, and load sensor are described in the method set forth in FIG. 9, one or more other sensors, such as temperature sensors, infrared sensors, spectroscopy sensors, audio sensors, capacitive sensors, fluorescence sensors, millimeter-wave radar sensors, depth cameras, etc., may be utilized in lieu of, or in addition to, one or more of a camera, load sensor, or inductance sensor, and the processor may prioritize data received from any one of the above sensors based on relative confidence in a given sensors' accuracy in determining the presence of a particular object.

If the camera does not detect the possible presence of a plastic bottle, the inductance sensor does not detect the possible presence of a metallic object, and the load sensor does not indicate the possible presence of a paper product, in step 920, the processor may execute instructions to deposit the inserted waste into a bin designated for landfill waste. Such instructions are made based on the fact that none of the sensors utilized determined that the inserted object may contain (at least partially) a recyclable material. Once again, other sensors may be utilized in lieu of, or in addition to, one or more of a camera, load sensor, or inductance sensor, in making the determination if a recyclable product is potentially present.

Referring again to step 910, while the processor prioritizes data received from the camera if the presence of a plastic bottle is determined, the processor may also utilize input from other sensors (e.g., a load sensor, millimeter-wave radar sensor, etc.) in step 922 to determine not only if the object is indeed a plastic bottle, but also if the plastic bottle is recyclable. That is, secondary sensor input from, for example, a load sensor, may indicate that the plastic bottle weighs more than a known threshold range of substantially empty, recyclable plastic bottles, as determined from the trained data set accessed by the processor. A plastic bottle weighing more than a known threshold range may indicate that the bottle still contains liquid. Depending upon local regulations, a plastic bottle containing more than a predetermined amount of liquid (including water) may be considered contaminated and, therefore, unrecyclable. Thus, if the determination from the secondary sensor data suggests that yes, a recyclable plastic bottle is detected, then the processor may provide instructions to deposit the waste in a plastics recyclable bin in step 924, and the waste is automatically deposited into an appropriate bin at step 940. However, if the secondary sensor data suggest that no, the plastic bottle detected by the camera is not recyclable (e.g., due to contamination, etc.), then the processor may provide instructions to deposit the waste in a landfill bin at step 926, and the waste is automatically deposited into an appropriate bin at step 940.

Similarly, referring again to step 914, the processor may prioritize data received from the inductance sensor if the presence of a metallic object is detected, but in step 928, the processor also utilizes input from other sensors (e.g., a camera, a load sensor, etc.) to determine not only if the object contains a metallic material, but if that metallic object is recyclable. As with the example above regarding the plastic bottle, secondary sensor input from, for example, a load sensor, may indicate that the metallic object (e.g., an aluminum beverage can) still contains liquid therein and is, therefore, too contaminated to be properly recycled according to local regulations. Thus, if the determination from the secondary sensor data suggests that yes, a recyclable metallic object is detected, then the processor may provide instructions to deposit the waste in a metallic recyclable bin in step 930, and the waste is automatically deposited into an appropriate bin at step 940. However, if the secondary sensor data suggest that the answer to the "is it recyclable" question is no, the metallic object detected by the inductance sensor is not recyclable (e.g., due to contamination, etc.), then the processor may provide instructions to deposit the waste in a landfill bin at step 932, and the waste is automatically deposited into an appropriate bin at step 940.

Referring once again to step 918, the processor may prioritize data received from the load sensor if the presence of a paper product or object is detected, but in step 934, the processor also utilizes input from other sensors (e.g., a camera, a millimeter-wave radar sensor, etc.) to determine not only if the object is made of paper, but if paper itself is recyclable. For example, secondary sensor input from a camera or millimeter-wave radar sensor may indicate that paper product may be too contaminated to be properly recycled according to local regulations. For example, while a corrugated box may typically be recyclable, a corrugated box having food or grease contamination on any surface thereof may not be recyclable. Thus, if the determination from the secondary sensor data suggests that yes, a recyclable paper product is detected, then the processor may provide instructions to deposit the waste in a paper recyclable bin in step 936, and the waste is automatically deposited into an appropriate bin at step 940. However, if the secondary sensor data suggest that no, the paper product detected by the load sensor is not recyclable (e.g., due to food contamination, etc.), then the processor may provide instructions to deposit the waste in a landfill bin at step 938, and the waste is automatically deposited into an appropriate bin at step 940.

While the method described above with respect to FIG. 9 details steps in which an object is both identified and its recyclability determined, it is to be noted that the standards of what is and is not acceptable as a recyclable material are often set by a local jurisdiction and/or recycling plant facility. Accordingly, the thresholds used by the processor to determine whether or not an object is recyclable may be dynamically adjusted based upon local codes and preferences at the location of the waste container. For example, one recycling plant may accept plastic bottles with up to one ounce of liquid still contained therein, whereas a recycling plant in another location may not accept plastic bottles with any liquid remaining therein. In accordance with aspects of the disclosure, such thresholds may be dynamically programmed into the processor to provide for location-specific sorting.

Similarly, different localities may restrict the types of materials which can be recycled. For example, some locations allow for all plastics to be recycled, while others restrict recycling to Type 1, 2, 4, and 6 plastics. Accordingly, in areas where only Type 1, 2, 4, and 6 plastics are deemed recyclable, the processor may be programmed to determine (via a variety of sensors, as described above) the type of plastics and sort accordingly. If, in the future, other types of plastic are considered recyclable in that area, the system can be locally or remotely updated to allow for such sorting.

In addition to the various types of sensors used in classifying and/or identifying the various pieces of waste inserted into the waste container, one or more additional sensors may be present within the waste container so as to determine the fullness and/or remaining capacity of one or more of the waste bins therein. For example, one or more sonar sensors or infrared sensors may be utilized within the waste container to determine the relative fullness and/or remaining capacity of one or more of the bins. The waste container may have an external indicator, such as a visual and/or audible indicator, which notifies a user or responsible party that a particular waste bin is at or near capacity and should therefore be emptied. For example, one or more light-emitting diodes or other visual indicators viewable directly at the waste container may be illuminated when a waste bin is at or near capacity. Alternatively and/or additionally, a graphical user interface located on the waste bin itself may provide a visual and/or audible indication that a waste bin is full, or a user interface on a web-enabled device (e.g., a smartphone, tablet computer, etc.) in communication with the waste container may provide a similar visual and/or audible indication that a waste bin is full.

In accordance with another embodiment, the waste bin may comprise a display or user interface thereon which may provide, for example, instructions on proper disposal of waste, information on what is (or is not) considered recyclable waste, advertisements, etc. In one aspect, in the event that a piece of waste of determined not to be recyclable due to contamination or other reasons, the display or user interface may provide an indication to the user as to why the waste was placed in a landfill waste bin as opposed to a recyclable waste bin. For example, if the user places a plastic bottle into the waste bin that is still filled with an impermissible amount of liquid, the display or user interface may provide visual and/or audible feedback to the user, explaining why the plastic bottle was not recyclable. Furthermore, the display or user interface may provide the user with one or more recommendations as to how to properly dispose of the waste in the future (e.g., "Please empty all liquids from plastic container prior to disposal"). Alternatively and/or additionally, the display or user interface may not be located on the waste bin itself, but may instead be located on a web-enabled device (e.g., a smartphone, tablet computer, etc.) in communication with the waste container.

Figure 8:
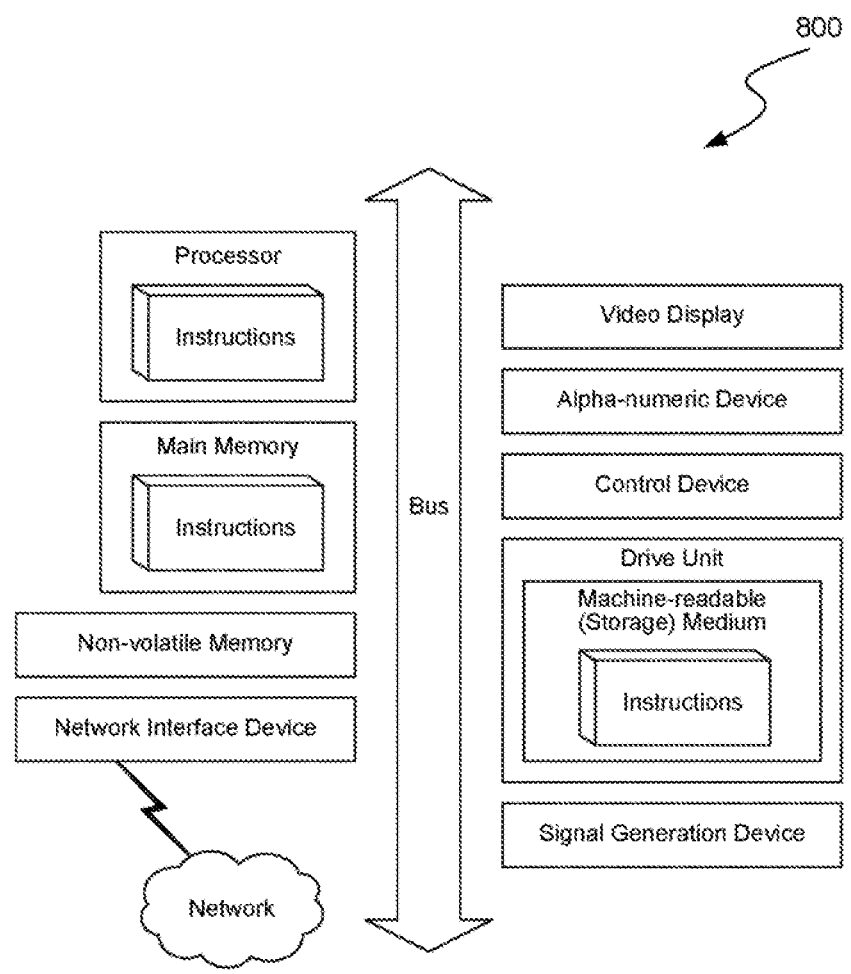
FIG. 8 is a diagrammatic representation of a machine in the example form of a computer system within which a set of instructions for causing the machine to perform any one or more of the methodologies or modules discussed in this document may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes elements such as a processor, memory, non-volatile memory, and an interface device. Various common components (e.g., cache memory) are omitted for illustrative simplicity. The computer system 800 is intended to illustrate a hardware device on which any of the components described in the examples of FIGS. 1-7 and 9 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Programming instructions are typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the nonvolatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method of automatically sorting waste, the method comprising:
   receiving a piece of waste;
   using a plurality of sensors to determine a plurality of properties associated with the piece of waste, wherein the sensors comprise at least two different sensor types;
   by a processor, based on at least one of the properties from at least a first one of the sensors, determining if the piece of waste is formed of a recyclable material;
   wherein determining if the piece of waste is formed of a recyclable material comprises determining that the piece of waste is not formed of a recyclable material if the processor cannot identify with at least 80% certainty that the piece of waste is formed of a recyclable material;
   if the piece of waste is not formed of a recyclable material, depositing the piece of waste in a non-recyclable waste bin;
   if the piece of waste is formed of a recyclable material, by the processor based on at least a second one of the properties from at least a second one of the sensors, determining if the piece of waste meets or exceeds a recyclability threshold; and
   if the piece of waste meets or exceeds the recyclability threshold, depositing the piece of waste into the recyclable waste bin, otherwise depositing the piece of waste in a non-recyclable waste bin.

2. The method of claim 1, wherein the sensor types comprise two or more of the following: inductance sensors, capacitance sensors, load sensors, cameras, temperature sensors, infrared light sensors, near-infrared light sensors, spectral measurement devices, audio sensors, capacitive sensors, fluorescence sensors, millimeter-wave radar sensors, and depth cameras.

3. The method of claim 1, wherein depositing the piece of waste in the recyclable waste bin comprises:
   identifying the recyclable material; and
   based on the recyclable material, selecting the recyclable waste bin from a set of candidate bins that include two or more of the following:
   a recyclable plastics bin,
   a recyclable paper bin,
   a recyclable metal bin,
   a recyclable cloth bin,
   a recyclable cardboard bin, or
   a recyclable glass bin.

4. The method of claim 1, wherein:
   the first one of the sensors comprises a camera;
   using the sensors to determine a properties associated with the piece of waste comprises using the camera to capture a digital image of the piece of waste,
   determining if the piece of waste is formed of a recyclable material comprises:
      processing the digital image to determine whether content of the digital image corresponds to one or more characteristics of a known recyclable object of a data set of known recyclable objects,
      if the content of the digital image corresponds to one or more characteristics of a known recyclable object, classifying the piece of waste as being formed of a recyclable material, and
      if the content of the digital image does not correspond to one or more characteristics of a known recyclable object, classifying the piece of waste as being formed of a non-recyclable material.

5. The method of claim 4, wherein processing the digital image to determine whether content of the digital image corresponds to one or more characteristics of a known recyclable object of the data set of known recyclable objects comprises determining whether the content of the digital image includes one or more of the following:
   a logo of a known recyclable object;
   text of a product name of a known recyclable object;
   a shape of a known recyclable object; or
   a color scheme of a known recyclable object.

6. The method of claim 4, wherein:
   classifying the piece of waste as being formed of a recyclable material comprises determining that the type of waste is a liquid container; and
   determining if the piece of waste meets or exceeds a recyclability threshold comprises using data received from at least one load sensor to determine whether the liquid container meets or exceeds a weight threshold.

7. The method of claim 4, wherein processing the digital image to determine whether content of the digital image corresponds to one or more characteristics of a known recyclable object of the data set of known recyclable objects comprises determining whether the content of the digital image includes one or more of the following:
   a logo of a known recyclable object, or
   text of a product name of a known recyclable object.

8. The method of claim 1, wherein:
   the first one of the sensors comprises an inductance sensor; and
   determining if the piece of waste is formed of a recyclable material comprises determining whether the inductance sensor indicates that the piece of waste is metallic.

9. The method of claim 8, wherein:
   classifying the piece of waste as being formed of a recyclable material comprises determining that the type of waste is a metallic food or beverage can; and
   determining if the piece of waste meets or exceeds a recyclability threshold comprises using data received from at least one load sensor to determine whether the can meets or exceeds a weight threshold.

10. The method of claim 1, wherein:
    if the piece of waste is not formed of a recyclable material, depositing the piece of waste in the recyclable waste bin comprises using an actuated sorting department to release the piece of waste to the recyclable waste bin; and
    if the piece of waste is formed of a non-recyclable material, depositing the piece of waste in the non-recyclable waste bin comprises using the actuated sorting department to release the piece of waste to the non-recyclable waste bin.

11. The method of claim 1, wherein upon determining that the piece of waste is not formed of a recyclable material, the method further comprises:
    determining whether the piece of waste is a compostable material; and if the piece of waste is a compostable material, depositing the piece of waste in a non-recyclable waste bin comprises depositing the piece of waste in a compost waste bin; and if the piece of waste is not a compostable material, depositing the piece of waste in a non-recyclable waste bin comprises depositing the piece of waste in a landfill waste bin.

12. The method of claim 1, wherein the sensor types comprise one or more of the following: millimeter-wave radar sensors or depth cameras.

13. The method of claim 1, wherein:
receiving the piece of waste comprises receiving the piece of waste into an actuated sorting compartment of a waste storage container that includes the recyclable waste bin and the non-recyclable waste bin;
using the sensors to determine the plurality of properties associated with the piece of waste comprises doing so while the piece of waste is within the actuated sorting compartment; and
depositing the waste into the recyclable waste bin or the non-recyclable waste bin comprises actuating the actuated sorting compartment to move the piece of waste into the recyclable waste bin or the non-recyclable waste bin.

14. A waste sorting system, comprising:
a waste sorting compartment;
a plurality of waste bins that include at least a recyclable waste bin and a non-recyclable waste bin;
a plurality of sensors that comprise at least two different sensor types;
a processor; and
a computer-readable medium containing programming instructions that are configured to instruct the processor to:
upon receipt of a piece of waste into the waste sorting compartment, use data detected by the sensors to determine a plurality of properties associated with the piece of waste,
based on at least one of the properties from at least a first one of the sensors, determine whether the piece of waste is formed of a recyclable material,
wherein the instructions to determine whether the piece of waste is formed of a recyclable material comprises instructions to determine that the piece of waste is not formed of a recyclable material if the processor cannot identify with at least 80% certainty that the piece of waste as being formed of a recyclable material,
if the piece of waste is not formed of a recyclable material, cause the waste sorting compartment to deposit the piece of waste into a non-recyclable waste bin,
if the piece of waste is formed of a recyclable material, based on at a second one of the properties from at least a second one of the sensors determine whether the piece of waste meets or exceeds a recyclability threshold, and
if the piece of waste meets or exceeds the recyclability threshold, cause the waste sorting compartment to deposit the piece of waste into a recyclable waste bin, otherwise cause the waste sorting compartment to deposit the piece of waste into a non-recyclable waste bin.

15. The system of claim 14, wherein the sensor types comprise two or more of the following: inductance sensors, capacitance sensors, load sensors, cameras, temperature sensors, infrared light sensors, near-infrared light sensors, spectral measurement devices, audio sensors, capacitive sensors, fluorescence sensors, millimeter-wave radar sensors, and depth cameras.

16. The system of claim 14, wherein the instructions to cause the waste sorting compartment to deposit the piece of waste in the recyclable waste bin comprise instructions to:
identify the recyclable material; and
based on the recyclable material, select the recyclable waste bin from a set of candidate bins that include two or more of the following:
a recyclable plastics bin,
a recyclable paper bin,
a recyclable metal bin,
a recyclable cloth bin,
a recyclable cardboard bin, or
a recyclable glass bin.

17. The system of claim 14, wherein:
the first one of the sensors comprises a camera;
the data detected by the sensors comprises a digital image of the piece of waste; and
the instructions to determine whether the piece of waste is formed of a recyclable material comprise instructions to:
process the digital image to determine whether content of the digital image corresponds to one or more characteristics of a known recyclable object of a data set of known recyclable objects,
if the content of the digital image corresponds to one or more characteristics of a known recyclable object, classify the piece of waste as being formed of a recyclable material, and
if the content of the digital image does not correspond to one or more characteristics of a known recyclable object, classify the piece of waste as being formed of a non-recyclable material.

18. The system of claim 17, wherein the instructions to process the digital image to determine whether content of the digital image corresponds to one or more characteristics of a known recyclable object comprises determining whether the content of the digital image includes one or more of the following:
a logo of a known recyclable object;
text of a product name of a known recyclable object;
a shape of a known recyclable object; or
a color scheme of a known recyclable object.

19. The system of claim 17, further comprising instructions to, when the system determines that the piece of waste is a liquid container, determine if the piece of waste meets or exceeds a recyclability threshold by using data received from at least one load sensor to determine whether the liquid container meets or exceeds a weight threshold.

20. The system of claim 17, wherein the instructions to process the digital image to determine whether content of the digital image corresponds to one or more characteristics of a known recyclable object comprises determining whether the content of the digital image includes one or more of the following:
a logo of a known recyclable object, or
text of a product name of a known recyclable object.

21. The system of claim 14, wherein:
the first one of the sensors comprises an inductance sensor; and
the instructions to use the plurality of sensors to determine whether the piece of waste is formed of a recyclable material comprise instructions to determine whether the inductance sensor indicates that the piece of waste is metallic.

22. The system of claim 21, wherein, when the system determines that the type of waste is a metallic food or beverage can, the instructions to determine whether the piece of waste meets or exceeds a recyclability threshold comprise instructions to use data received from at least one load sensor to determine whether the can meets or exceeds a weight threshold.

23. The system of claim 14, further comprising additional instructions to, upon determining that the piece of waste is not formed of a recyclable material:
- determine whether the piece of waste is a compostable material; and
- if the piece of waste is a compostable material, deposit the piece of waste in a non-recyclable waste bin that is a compost waste bin; and
- if the piece of waste is not a compostable material, deposit the piece of waste in a non-recyclable waste bin that is a landfill waste bin.

24. The system of claim 14, wherein the sensor types comprise one or more of the following: millimeter-wave radar sensors or depth cameras.

25. The system of claim 14, wherein the waste sorting compartment is an actuated sorting compartment that is configured to move the piece of waste into the recyclable waste bin or the non-recyclable waste bin.

* * * * *